US012657205B1

(12) United States Patent
Sen et al.

(10) Patent No.: US 12,657,205 B1
(45) Date of Patent: Jun. 16, 2026

(54) ONLINE DATA VALIDATION FOR DATABASE REPLICATION

(71) Applicant: Databricks, Inc., San Francisco, CA (US)

(72) Inventors: Rajkumar Sen, Belmont, CA (US); Mark David Wright, Austin, TX (US); Parthasarthi Vishram Bapat, Belmont, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 19/043,255

(22) Filed: Jan. 31, 2025

(51) Int. Cl.
*G06F 16/27* (2019.01)
*G06F 16/22* (2019.01)

(52) U.S. Cl.
CPC .......... *G06F 16/27* (2019.01); *G06F 16/2282* (2019.01)

(58) Field of Classification Search
CPC ...... G06F 16/27; G06F 16/273; G06F 16/275; G06F 16/278; G06F 16/2282
See application file for complete search history.

(56) References Cited

U.S. PATENT DOCUMENTS

| | | | |
|---|---|---|---|
| 11,687,559 B1 * | 6/2023 | Padwad .............. | G06F 16/1794 707/610 |
| 12,373,419 B1 * | 7/2025 | Holenstein .......... | G06F 16/2255 |
| 2006/0212465 A1 * | 9/2006 | Fish .................... | G06F 11/1662 |
| 2012/0317134 A1 * | 12/2012 | Bourbonnais ....... | G06F 16/2365 707/769 |
| 2024/0062805 A1 * | 2/2024 | Huang .................. | G11C 11/408 |
| 2025/0130898 A1 * | 4/2025 | Panda ................. | G06F 11/1048 |

* cited by examiner

*Primary Examiner* — Merilyn P Nguyen

(74) *Attorney, Agent, or Firm* — Fenwick & West LLP

(57) ABSTRACT

A system replicates database table, for example, from a source database system to a target database system. The system may use change data capture (CDC) for performing replication. The system according to an embodiment, verifies whether the database replication is working correctly. The system ensures that all operations applied to each source database table in the source database table are applied to the corresponding target database table of the target database system. The system repeatedly runs queries to determine whether any changes occurred in the database table since the last time the check was performed. If the system determines changes in the database table, the system partitions the changed rows and processes each partition to determine whether there are any missing inserts and if any updates are corrupted.

20 Claims, 8 Drawing Sheets

ONLINE DATA VALIDATION FOR DATABASE REPLICATION

TECHNICAL FIELD

This disclosure relates generally to replication of data in databases and in particular to online verification of consistency of data being replicated in databases.

BACKGROUND

A database system performs replication by copying data from a source database to a target database. Data replication may be performed for various reasons, for example, to make the data efficiently accessible across geographically separate locations, for high availability of data in case of failures, for backup, and so on. Database replication may be an ongoing process that occurs in real time as records are created, updated, or deleted in a source database. There may be failures while data is being replicated, for example, system failures or network failures. As a result, there may be loss of data being replicated. For example, records inserted in the source database sent for replication may never be received at the target database, thereby resulting in loss of data. Database systems validate data being replicated to ensure that there is no loss or corruption of data. Validating data replicated from a production database system is challenging because the source database is continuously changing. Techniques for validation of replication that pause the source database are undesirable, since they impact the performance of a production system.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure 1:
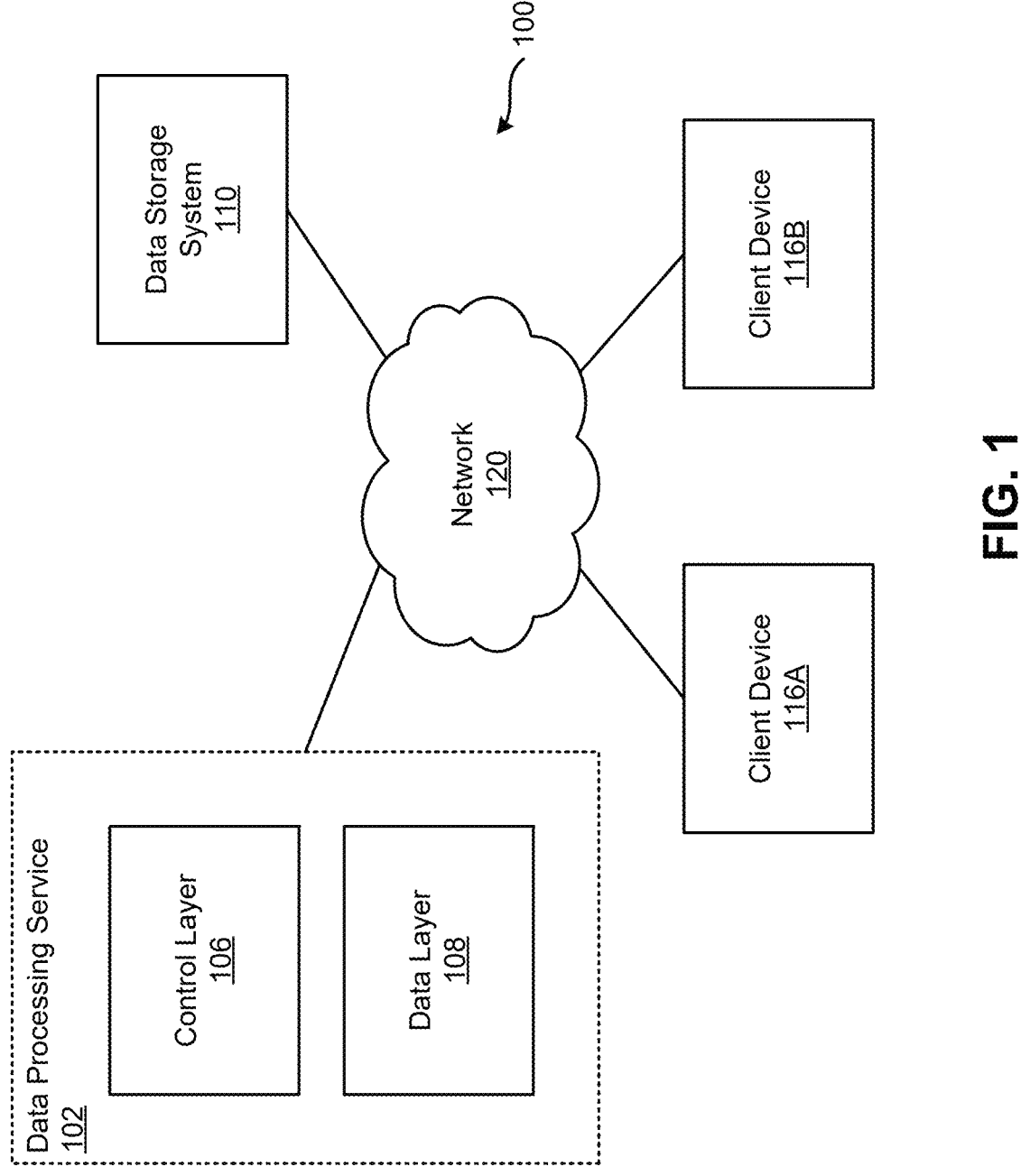
FIG. 1 is a high-level block diagram of a system environment for a data processing service, in accordance with an embodiment.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

A system replicates database table, for example, a source database table is replicated from a source database system to a target database table in a target database system. For example, as operations such as insert, update, and delete performed on the source database table, the same operations are also performed on the target database table. The system may use change data capture (CDC) for performing replication. For example, logs describing the changes on the source database system are send to the target database system and applied to the respective tables.

Occasionally the replication process has errors. For example, certain operations may get not get applied properly in the database tables of the target database system. For example, an insert or update operation may be performed on the source table in the source database system but never performed on the target database table of the target database system. Each of the source database system or the target database system can be any type of database, for example, an OLTP (online transaction processing) system or an OLAP (online analytical processing) system.

The system according to an embodiment, verifies whether the database replication is working correctly. Accordingly, the system ensures that all operations applied to each source database table in the source database table are applied to the corresponding target database table of the target database system.

Embodiments comprise methods for performing the processes disclosed herein. Embodiments further comprise non-transitory computer readable storage mediums, storing instructions that when executed by one or more computer processors cause the one or more computer processors to perform steps of the methods disclosed herein.

Embodiments comprise computer systems including one or more computer processors, and a non-transitory computer readable storage medium, storing instructions that when executed by the one or more computer processors cause the one or more computer processors to perform steps of the methods disclosed herein.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

FIG. 1 is a high-level block diagram of a system environment for a data processing service, in accordance with an embodiment.

The data processing service 102 is a service for managing and coordinating data processing services (e.g., database services) to users of client devices 116. The data processing service 102 may manage one or more applications that users of client devices 116 can use to communicate with the data processing service 102. The data processing service 102 is also referred to herein as a database system or a system. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 800 as described with FIG. 8.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™

Data Storage System

Figure 2:
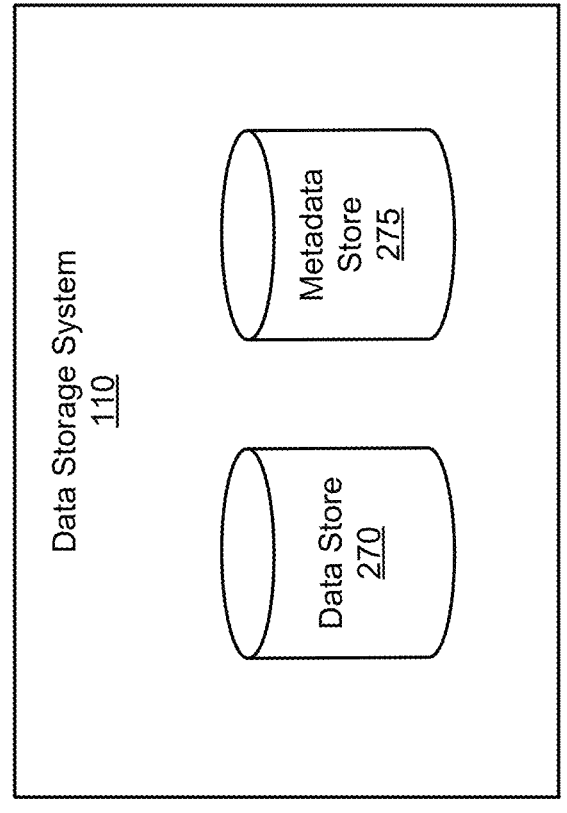
FIG. 2 illustrates a block diagram of an architecture of the data storage system 110, in accordance with an embodiment.

FIG. 2 illustrates a block diagram of an architecture of the data storage system 110, in accordance with an embodiment. As illustrated in FIG. 2, the data storage system 110 includes a data store 270 and a metadata store 275. The data storage system 110 may have multiple instances of the data store 270 and the metadata store 275, each dedicated to storing data for a tenant of the data processing service 102. In one embodiment, the data store 270 stores data in a format of a data table. A data table may include a set of records, where each record may include values for one or more features or keys. A feature may represent a measurable piece of data that can be used for analysis, such as, login account, timestep, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

In one embodiment, a data table may be stored in the data store 270 in conjunction with metadata stored in the metadata store 275. As described above, the metadata store 275 may include one or more metadata files for a data table. In some embodiments, the metadata store 275 stores metadata in the form of one or more transaction logs. A transaction log for a data table is a log recording a sequence of transactions that were performed on the data table. A transaction may perform one or more changes to a data table that may include removal, modification, or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110. The metadata in the transaction log may record removal, update, or addition of data files to a data table.

Control Layer

Figure 3:
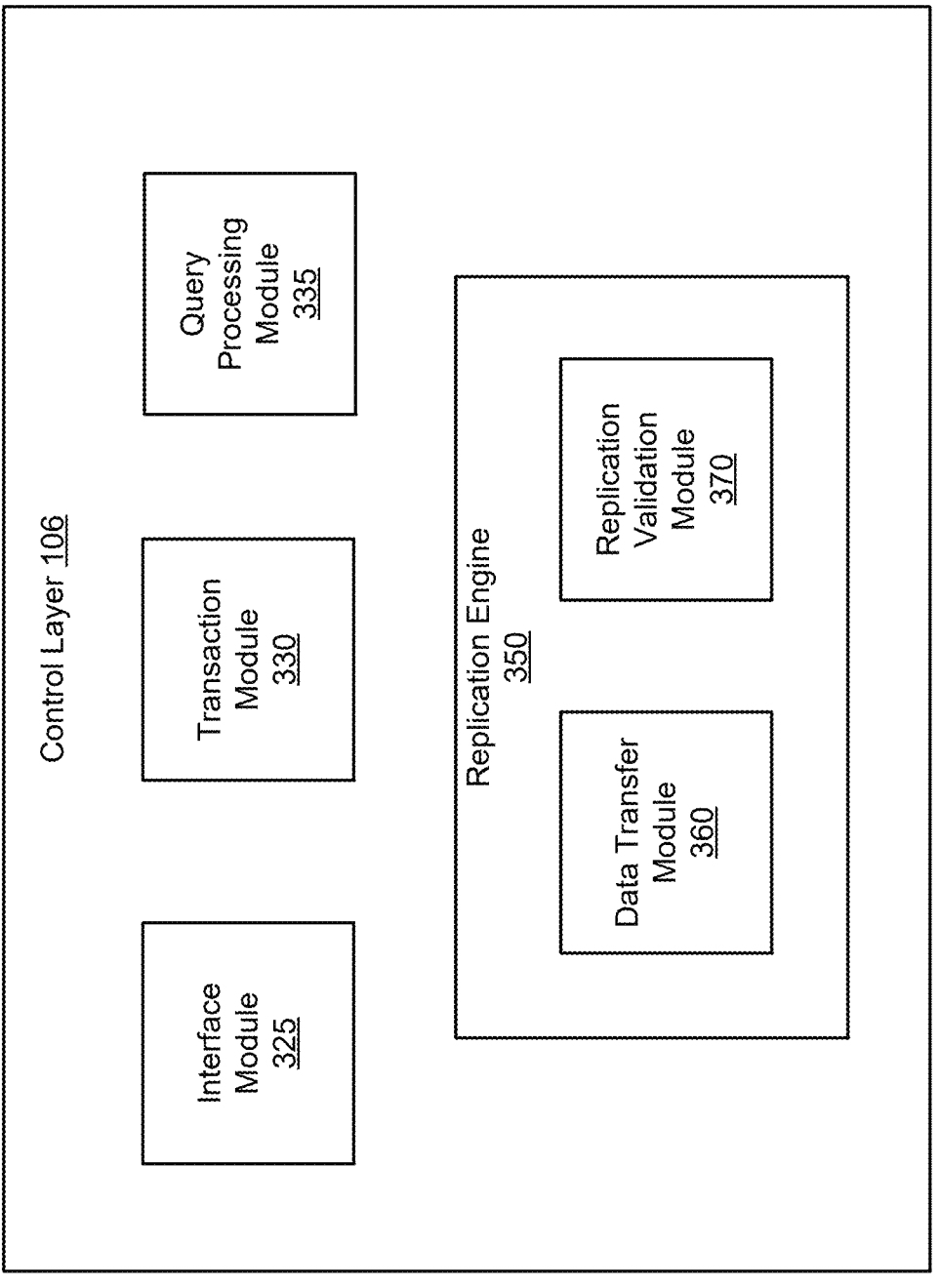
FIG. 3 is a block diagram of an architecture of a control layer 106, in accordance with an embodiment.

FIG. 3 is a block diagram of an architecture of a control layer 106, in accordance with an embodiment. In one embodiment, the data processing service 102 includes an interface module 325, a transaction module 330, a query processing module 335, and a replication engine 350. The modules 325, 330, 335, and 350 may be structured for execution by a computer system, e.g., 800 having some or all of the components as described in FIG. 8, such that the computer system 800 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the interface module 325.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108 and receives responses to the queries from clusters in which the queries are executed.

The replication engine 350 performs replication of database tables. The replication engine 350 comprises a data transfer module 360 and a replication validation module 370. Other embodiments of replication engine 350 may include more or fewer modules than those indicated in FIG. 5. The replication engine 350 may execute on the data storage system 110 or any system of the data layer 108.

The data transfer module 360 performs transfer of data from a source database system to a target database system. The data transfer module 360 in the source database system may utilize change data capture for transferring data from the source database system to the target database system. According to an embodiment, the data sent by the data transfer module 360 represents changes to a database table. The data transfer module 360 in the target database system receives the data sent by the source database system. According to an embodiment, the target data transfer module 360 of the target database system receives changes performed to a particular database table in the source database system and applies the changes to the corresponding database table stored in the source database system to keep the data of the target database system in sync with the data of the source database system. For example, if one or more rows of the database table are inserted, deleted, or updated, the change data capture logs represent the modifications performed. The change data capture logs are sent by the source database system to the target database system. The target database system applies the change data capture logs to perform the corresponding insert, delete, or update operations to the corresponding rows of the corresponding database table.

The replication validation module 370 ensures that the replication process is performing correctly. For example, due to system failures or network failures not all operations performed to the database tables of the source database system may get applied to the corresponding database tables of the target database system. As a result, the database tables of the target database system may not be entirely in sync with the corresponding database tables of the source database system. The replication validation module 370 analyzes the database tables of the target database system to determine if there are some discrepancies between the data of the database tables stored in the target database system compared to the corresponding database tables stored in the source database system, for example, if certain operations performed in the source database system are not applied to the target database system. The replication validation module 370 reports any such discrepancies so that a user, for example, a database administrator can review the discrepancies and take appropriate actions. For example, the database administrator may manually apply certain specific sets of change data capture logs from the source database system to the target database system. Alternately, the replication validation module 370 may automatically reapply certain change data capture logs from the source database system to the target database system.

Figure 4:
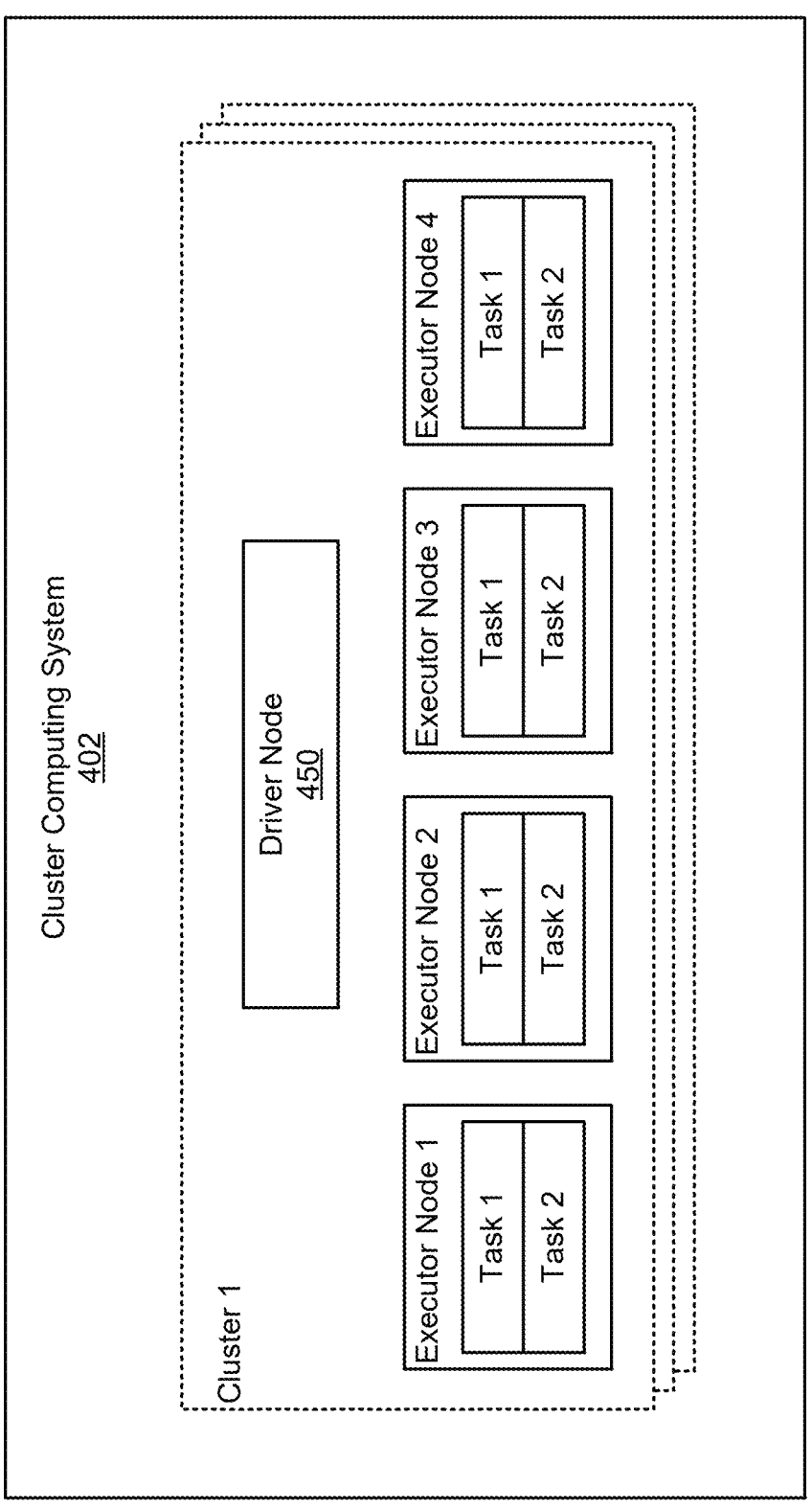
FIG. 4 is a block diagram of an architecture of a cluster computing system 402 of the data layer 108, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 800 having some or all of the components as described in FIG. 8, such that the computer system 800 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450. An executor node may represent a service-pod that hosts the metadata (and cache) service.

Process of Replication Validation

Figure 5:
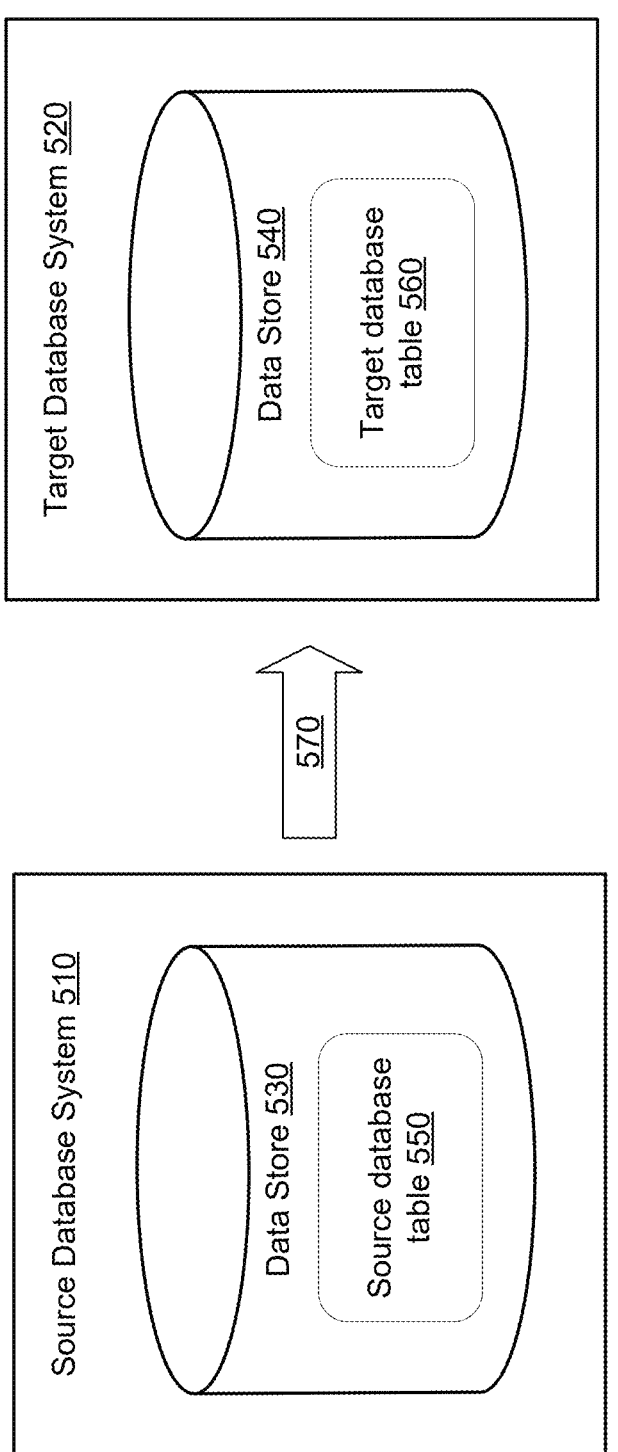
FIG. 5 shows a block diagram illustrating the system environment for performing the process of replication of a database table, according to an embodiment.

FIG. 5 shows a block diagram illustrating the system environment for performing the process of replication of a database table, according to an embodiment. The system environment comprises a source database system 510 and a target database system 520. The source database system 510 includes a data store 530 and the target database system 520 includes a data store 540. The data store 530 of the source database system 510 includes a source database table 550 that is replicated 570 to a target database table 560 stored in the data store 540 of the target database system 520. According to an embodiment, the source database system 510 generates change data capture (CDC) logs that store information describing modifications to database tables of the source database system 510. The source database system 510 sends the CDC logs to the target database system 520 that applies the CDC logs to the database tables of the target database system 520. Applying the CDC logs of the source database system 510 to the target database tables 560 of the target database system 520 causes the source database tables 550 of the source database system to be replicated to the target database tables 560 of the target database system 520. This process may be repeated on a continuous basis or based on a predetermined schedule. According to an embodiment, the source database system is a production system that receives requests from users and processes them. As a result, the database tables 550 of the source database system 510 may be updated on a continuous basis and the changes made to the database tables 550 are propagated to the database tables 560 of the target database system 520. This process is referred to as replication of the source database tables 550 to the corresponding target database tables 560. The target database system 520 further performs validation of the replicated data to ensure that there is not data loss during the replication process, for example, due to system or network failures. The validation process is further illustrated in FIGS. 6-7 and described in connection with FIGS. 6-7.

According to an embodiment, the database tables that are replicated from source database system 510 to target database system 520 have a last update time column. The last update time column includes a timestamp value for each row that represents the last time the row was modified. The last update time value for the row is initialized to the time value when the row is inserted. Subsequently if there is any update to the row, the last time value is modified to represent the update time.

According to an embodiment, the database tables that are replicated from source database system 510 to target database system 520 have an operation type column that indicates whether the last operation performed on the row was an insert operation or an update operation. For example, the operation type column may store a value 'I' if the last operation type performed on the row was an insert operation and stores the value 'U' if the last operation type performed on the row was an update. The value of the operation type of a row may be initialized to 'I' when the row is inserted. When any update operation is performed, the value of the operation type of a row is changed to 'U'. The value of the operation type may be set using a construct of the database such as a trigger operation. A trigger operation may be defined that sets the value of the operation type of a row may be initialized to 'I' upon an insert operation and sets the value of the operation type of the row to 'U' upon an update operation.

Figure 6:
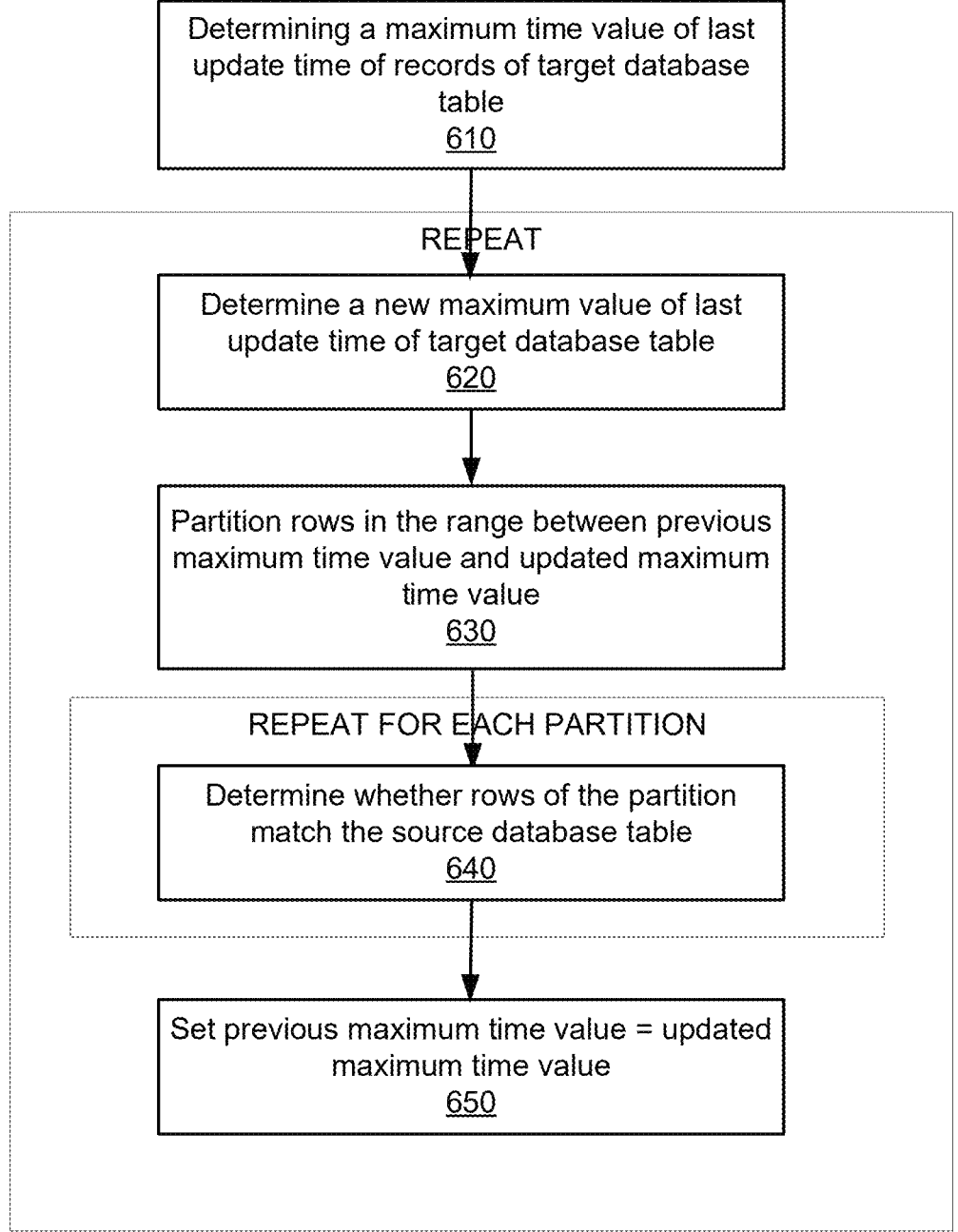
FIG. 6 shows a flowchart illustrating the process of validating data being replicated, according to an embodiment.

FIG. 6 shows a flowchart illustrating the process of validating data being replicated, according to an embodiment. The steps may be performed by modules of the database system, for example, the replication engine 350. The steps may be performed in an order different from that indicated in FIG. 6.

The process illustrated in FIG. 6 is described in connection with validating a particular target database table 560 that is replicated from the source database table 550 source database system to a target database system. However, the process can be applied to any database table or a set of database tables. The process illustrated in FIG. 6 may be executed by the replication engine 350 of the target database system.

Figure 7:
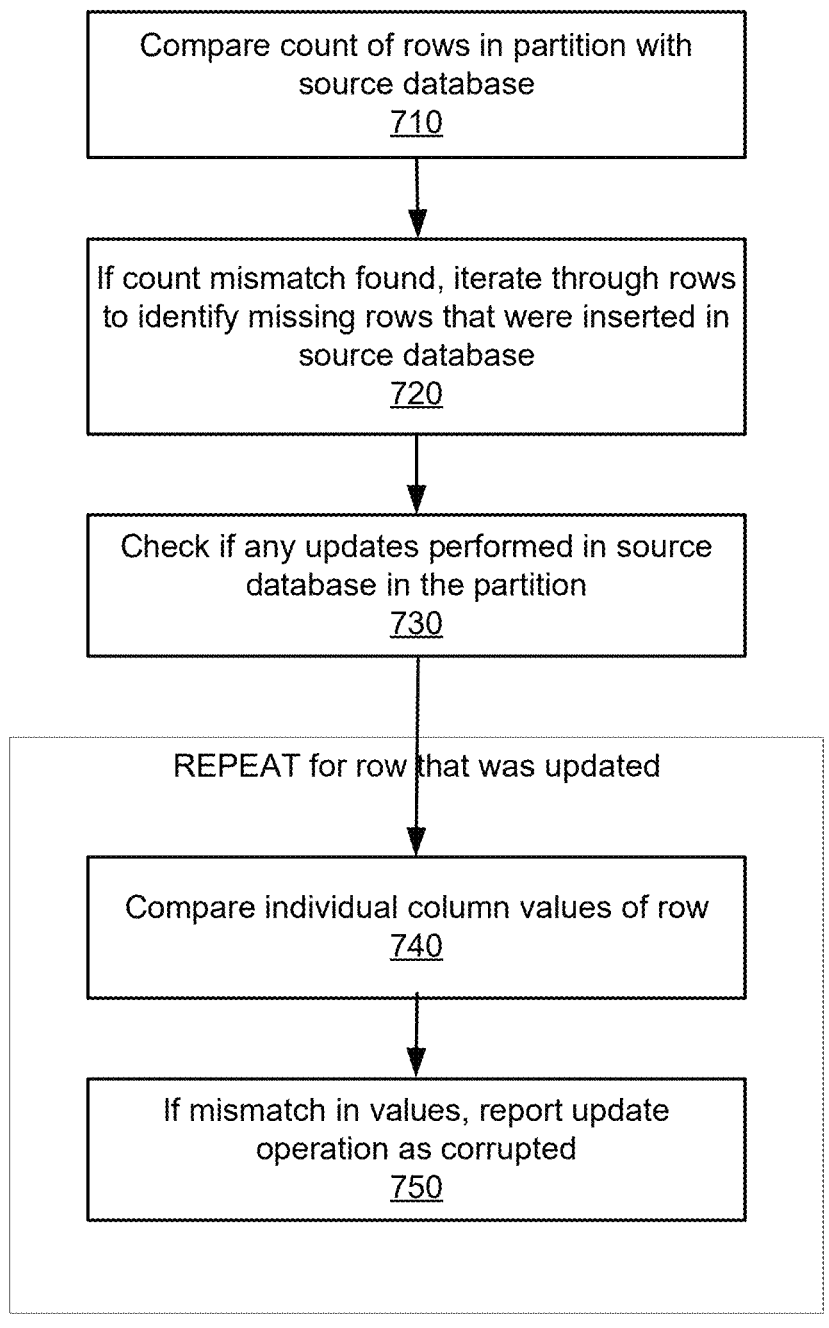
FIG. 7 shows a flowchart illustrating the process of providing secure access to a database file to an external system, according to an embodiment.

The replication engine 350 of the target database system 520 determines 610 a maximum value of the last update time of records of the database table. According to an embodiment, the maximum value of the last update time that is determined is an initial maximum value M1 of the last update time of records of the target database table is determined, which is then repeatedly recomputed. The initial maximum value M1 of the last update time of records of the target database table is determined by determining a minimum time value and a maximum time value of the last update time column of the target database table and the source database table. The replication engine 350 of the target database system 520 may determine a value associated with the target database table by running a database query. For example, the replication engine 350 of the target database system 520 may determine the minimum and maximum values of the last update time column by executing one or more database queries such as SQL (structured query language) queries. The replication engine 350 of the target database system 520 may determine the minimum and maximum values of the last update time column of the source database table by sending the one or more database queries to the source database system 510 for execution and receiving the result of execution of the database queries from the source database system 510. The replication engine compares a count of rows that have their last update time value within a range of the minimum time value and the maximum time value for the source database table and the target database table. If the replication engine 350 determines that the two counts match, the replication engine 350 uses the maximum value determined for target database table as the maximum time value M1. If the replication engine 350 determines a mismatch in the count of rows based on the comparison, the replication engine 350 may compare rows of the source database table and the target database table to determine the cause of the mismatch. The replication engine 350 may compare rows of the source database table and the target database by partitioning the rows and processing the partitions as illustrated in FIGS. 6-7 and described in connection with FIGS. 6-7.

The replication engine 350 repeats the steps 620, 630, 640, 650 multiple times. For example, the process illustrated in FIG. 6 may be a process that runs continuously as long as the source database system 510 is operational. The execution of each iteration of the loop in FIG. 6 may be performed based on a predetermined schedule, for example, on a periodic basis. The initial maximum value M1 may is referred to as the previous maximum value Mp as the execution of the iterations is started. For each new iteration, the replication engine 350 may update the value Mp based on the maximum value of the last update time column of the previous iteration.

The replication engine 350 determines 620 a new maximum value Mn of the last update time column for the target database table. The replication engine 350 may determine 620 the new maximum value Mn of the last update time column by executing a database query that returns the maximum value of the last update time column. If the replication engine 350 determines that the new maximum last update time value Mn is same as the previous maximum last update time value Mp, the replication engine 350 determines that there were not inserts or updates since the last iteration and there are no further checks that need to be performed for this iteration. Accordingly, the replication engine 350 waits for the next iteration.

However, if the replication engine 350 determines that the new maximum last update time value Mn is greater than the previous maximum last update time value Mp, the replication engine 350 determines that there were inserts or updates performed since the last iteration and performs further checks. The replication engine 350 partitions the rows that have last update time in the range between Mp and Mn. According to an embodiment, the replication engine 350 divides the time interval Mp to Mn into equal sized sub intervals and assigns the rows within each subinterval to a partition. The replication engine 350 can process each partition of rows in parallel. The number of partitions may be determined based on the number of processors available to process the database table. According to an embodiment, a subrange of the time range Mp to Mn is assigned to each partition and the rows the target database table that have last update time in the subrange are selected for processing in that partition.

For each partition, the replication engine 350 repeats the step 640. Accordingly, the replication engine 350 determines 640 whether rows of the target database table that belong to the partition match corresponding rows of the source database table. For example, replication engine 350 determines 640 whether any inserts performed in the source database table are missing in the target database table and whether any updates were executed properly so that the updated values of the row in the target database table match with the updated values of the source database table. Each partition may be processed in parallel depending on the number of processors available. The detailed processing of each partition is illustrated in FIG. 7.

FIG. 7 shows a flowchart illustrating the process performed for each partition of rows, according to an embodiment. The steps may be performed by modules of the database system, for example, the replication engine 350. The steps may be performed in an order different from that indicated in FIG. 7.

The replication engine 350 compares 710 counts of rows in each partition of the target database with the corresponding count in the source database. For example, if the partition has time range T1 . . . . T2, the replication engine 350 executes a database query that counts all the rows that have last update time greater than T1 and less than or equal to T2. The replication engine 350 sends a similar database query to the source database for execution and compares the results of execution of the two queries. If the counts have mismatch, the likely scenario is that the target database system has a smaller count compared to the source database due to loss of rows that were sent by the source database. In this case, the replication engine 350 sends a query to retrieve primary keys of the source database for the partition and compares the returned values with the primary keys of the target database table in the target database. If the replication engine 350 identifies a primary key that is present in the source database but missing from the target database, the replication engine 350 reports the missing primary key.

The replication engine 350 further checks if any operations within the partition are updates. The replication engine 350 may determine that there are updates by checking the operation type value for rows within the partition, either on the target database or on the source database. If there were updates performed within the time interval of the partition, the replication engine 350 repeats the steps 740 and 750 for each row that has operation type indicates as an update.

The replication engine 350 compares 740 individual columns values for each row. If the replication engine 350 identifies a mismatch, the replication engine 350 reports 750 the row as a corrupted update operation. The replication engine 350 may save a report describing all rows that are identified as missing or corrupted during replication. The rows may be identified using their primary keys for reporting purposes.

Computer Architecture

Figure 8:
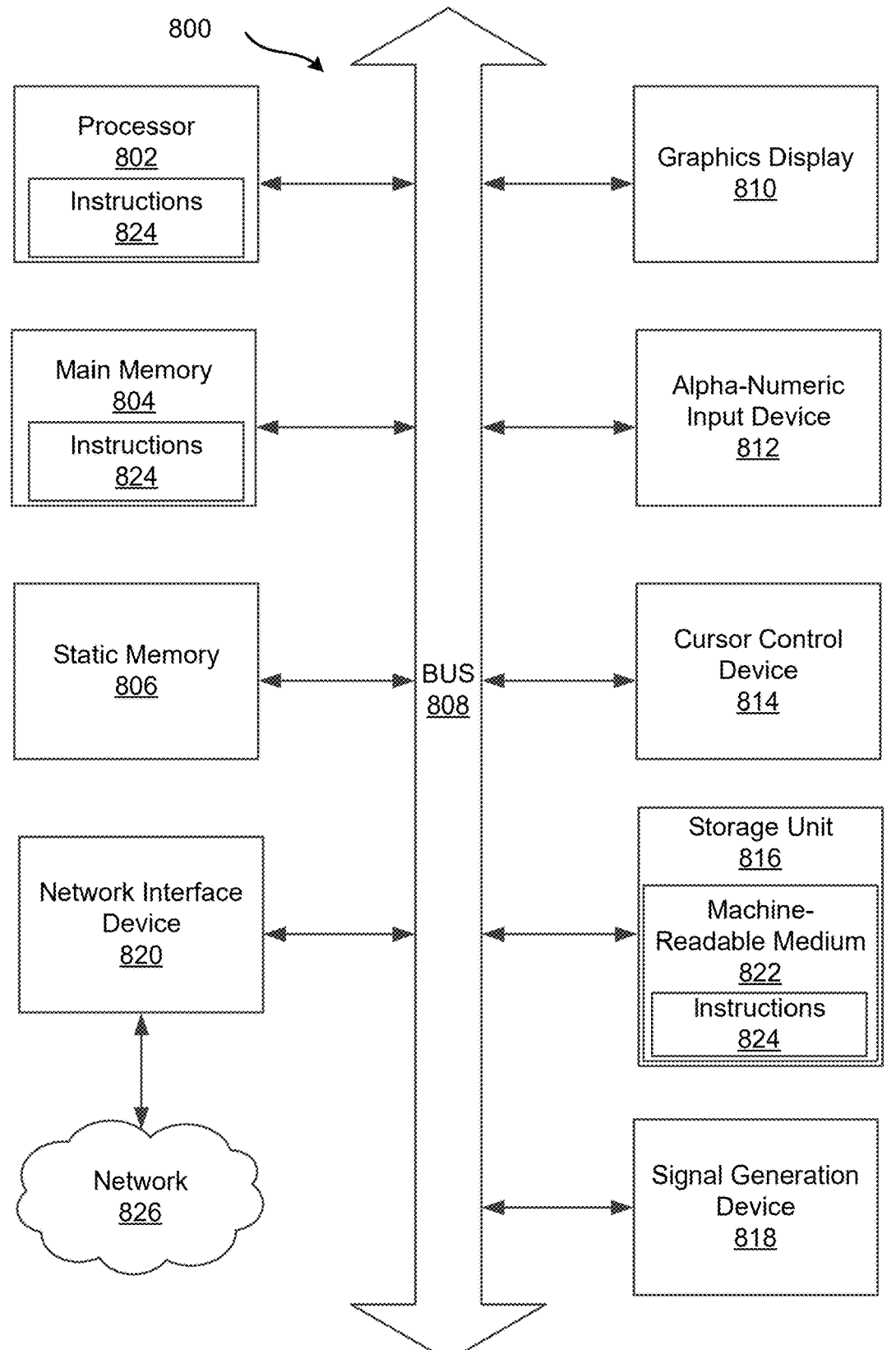
FIG. 8 illustrates an example machine to read and execute computer readable instructions, in accordance with an embodiment.

Turning now to FIG. 8, illustrated is an example machine to read and execute computer readable instructions, in accordance with an embodiment. Specifically, FIG. 8 shows a diagrammatic representation of the data processing service 102 (and/or data processing system) in the example form of a computer system 800. The computer system 800 can be used to execute instructions 824 (e.g., program code or software) for causing the machine to perform any one or more of the methodologies (or processes) described herein.

In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IOT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 800 also includes a main memory 804. The computer system may include a storage unit 816. The processor 802, main memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include instructions for implementing the functionalities of the transaction module 330. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826, such as the network 120, via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method of validating replication of database tables, comprising:

receiving, by a target database system, a set of changes to a source database table stored in a source database system, wherein the target database system applies the set of changes to a target database table, wherein each of the source database table and the target database table comprises at least a last update time column storing a time of last update of rows of corresponding database table;

determining an initial maximum time value of the last update time column, wherein the initial maximum time value is referred to as a previous maximum time value; and repeatedly performing:

determining an updated maximum time value based on the last update time column;

comparing a count of rows having last update time value within a range of the previous maximum time value and the updated maximum time value for the source database table and the target database table;

responsive to determining a mismatch in counts of rows based on the comparison, determining a plurality of subsets of rows of the target database table with last update time value within a range of the previous maximum time value and the updated maximum time value;

for each of the plurality of subsets of rows:

determining whether rows of the subset of rows of the target database table match corresponding rows of the source database table, and responsive to determining a mismatch, storing information describing the mismatch; and referring to the updated maximum time value as the previous maximum time value for next iteration.

2. The method of claim 1, wherein determining whether the rows of the subset of rows of the target database table match corresponding rows of the source database table comprises:

comparing primary keys of the target database table and the source database table for the subset of rows; and responsive to identifying a primary key of a row missing in one of the target database table or the source database table but present in the other of the target database table or the source database table, storing information describing the row.

3. The method of claim 1, wherein determining whether the rows of the subset of rows of the target database table match corresponding rows of the source database table comprises:

for each row of the target database table that is determined to be updated:

comparing all columns of the row with a corresponding row from the source database table; and responsive to identifying a mismatch in a column of the row, storing information describing the row.

4. The method of claim 1, further comprising:

responsive to determining that a number of rows of a subset of rows of the target database table matches a number of rows of a corresponding subset of rows of the source database table, skipping further processing of the subset of rows.

5. The method of claim 1, wherein the target database table has a column storing information describing a type of database operation performed on each row, the type of database operation comprising one of: update or insert.

6. The method of claim 1, wherein determining a maximum time value for a particular database table comprises executing a database query that returns maximum value stored in the last update time column.

7. The method of claim 1, wherein determining the initial maximum time value of the last update time column comprises:

determining a minimum time value and a maximum time value of the last update time column of the target database table and the source database table;

comparing a count of rows having last update time value within a range of the minimum time value and the maximum time value for the source database table and the target database table;

responsive to determining a mismatch in the count of rows, comparing rows of the source database table and the target database table; and using the maximum time value of the last update time column of the target database table as the initial maximum time value.

8. A non-transitory computer readable medium comprising stored instructions, the stored instructions when executed by one or more computer processors, cause the one or more computer processors to:

receive, by a target database system, a set of changes to a source database table stored in a source database system, wherein the target database system applies the set of changes to a target database table, wherein each of the source database table and the target database table comprises at least a last update time column storing a time of last update of rows of corresponding database table;

determine an initial maximum time value of the last update time column, wherein the initial maximum time value is referred to as a previous maximum time value; and repeatedly perform:

determine an updated maximum time value based on the last update time column;

compare a count of rows having last update time value within a range of the previous maximum time value and the updated maximum time value for the source database table and the target database table;

responsive to determining a mismatch in counts of rows based on the comparison, determining a plurality of subsets of rows of the target database table with last update time value within a range of the previous maximum time value and the updated maximum time value;

for each of the plurality of subsets of rows:
    determine whether rows of the subset of rows of the
        target database table match corresponding rows of
        the source database table, and
    responsive to determining a mismatch, store infor-
        mation describing the mismatch; and
    refer to the updated maximum time value as the pre-
        vious maximum time value for next iteration.

9. The non-transitory computer readable medium of claim
8, wherein instructions to determine whether the rows of the
subset of rows of the target database table match corre-
sponding rows of the source database table further cause the
one or more computer processors to:
    compare primary keys of the target database table and the
        source database table for the subset of rows; and
    responsive to identifying a primary key of a row missing
        in one of the target database table or the source data-
        base table but present in the other of the target database
        table or the source database table, store information
        describing the row.

10. The non-transitory computer readable medium of
claim 8, wherein determining whether the rows of the subset
of rows of the target database table match corresponding
rows of the source database table comprises:
    for each row of the target database table that is determined
        to be updated:
        comparing all columns of the row with a corresponding
            row from the source database table; and
        responsive to identifying a mismatch in a column of the
            row, storing information describing the row.

11. The non-transitory computer readable medium of
claim 8, wherein the stored instructions further cause the one
or more computer system to:
    responsive to determining that a number of rows of a
        subset of rows of the target database table matches a
        number of rows of a corresponding subset of rows of
        the source database table, skip further processing of the
        subset of rows.

12. The non-transitory computer readable medium of
claim 8, wherein the target database table has a column
storing information describing a type of database operation
performed on each row, the type of database operation
comprising one of: update or insert.

13. The non-transitory computer readable medium of
claim 8, wherein instructions to determine a maximum time
value for a particular database table cause the one or more
computer processors to execute a database query that returns
maximum value stored in the last update time column.

14. The non-transitory computer readable medium of
claim 8, wherein instructions to determine the initial maxi-
mum time value of the last update time column cause the one
or more computer processors to:
    determining a minimum time value and a maximum time
        value of the last update time column of the target
        database table and the source database table;
    comparing a count of rows having last update time value
        within a range of the minimum time value and the
        maximum time value for the source database table and
        the target database table;
    responsive to determining a mismatch in the count of
        rows, comparing rows of the source database table and
        the target database table; and
    using the maximum time value of the last update time
        column of the target database table as the initial maxi-
        mum time value.

15. A computer system, comprising:
    one or more computer processors, and a non-transitory computer readable medium comprising
        stored instructions, the stored instructions when
        executed by the one or more computer processors,
        cause the one or more computer processors to:
    receive, by a target database system, a set of changes to
        a source database table stored in a source database
        system, wherein the target database system applies
        the set of changes to a target database table, wherein
        each of the source database table and the target
        database table comprises at least a last update time
        column storing a time of last update of rows of
        corresponding database table;
    determine an initial maximum time value of the last
        update time column, wherein the initial maximum
        time value is referred to as a previous maximum time
        value; and
    repeatedly perform:
        determine an updated maximum time value based on
            the last update time column;
        compare a count of rows having last update time
            value within a range of the previous maximum
            time value and the updated maximum time value
            for the source database table and the target data-
            base table;
        responsive to determining a mismatch in counts of
            rows based on the comparison, determining a
            plurality of subsets of rows of the target database
            table with last update time value within a range of
            the previous maximum time value and the updated
            maximum time value;
        for each of the plurality of subsets of rows:
            determine whether rows of the subset of rows of
                the target database table match corresponding
                rows of the source database table, and
            responsive to determining a mismatch, store infor-
                mation describing the mismatch; and
        refer to the updated maximum time value as the
            previous maximum time value for next iteration.

16. The computer system of claim 15, wherein determin-
ing whether the rows of the subset of rows of the target
database table match corresponding rows of the source
database table comprises:
    comparing primary keys of the target database table and
        the source database table for the subset of rows; and
    responsive to identifying a primary key of a row missing
        in one of the target database table or the source data-
        base table but present in the other of the target database
        table or the source database table, storing information
        describing the row.

17. The computer system of claim 15, wherein instruc-
tions to determine whether the rows of the subset of rows of
the target database table match corresponding rows of the
source database table cause the one or more computer
processors to:
    for each row of the target database table that is determined
        to be updated:
        compare all columns of the row with a corresponding
            row from the source database table; and
        responsive to identifying a mismatch in a column of the
            row, store information describing the row.

18. The computer system of claim 15, wherein the stored
instructions further cause the one or more computer system
to:
    responsive to determining that a number of rows of a
        subset of rows of the target database table matches a number of rows of a corresponding subset of rows of the source database table, skip further processing of the subset of rows.

19. The computer system of claim 15, wherein the target database table has a column storing information describing a type of database operation performed on each row, the type of database operation comprising one of: update or insert.

20. The computer system of claim 15, wherein instructions to determine the initial maximum time value of the last update time column further cause the one or more computer system to:

determine a minimum time value and a maximum time value of the last update time column of the target database table and the source database table;

compare a count of rows having last update time value within a range of the minimum time value and the maximum time value for the source database table and the target database table;

responsive to determining a mismatch in the count of rows, compare rows of the source database table and the target database table; and use the maximum time value of the last update time column of the target database table as the initial maximum time value.

* * * * *